United States Patent [19]

Marrujo

[11] Patent Number: 4,790,496
[45] Date of Patent: Dec. 13, 1988

[54] AIRCRAFT SEAT WITH FLEXIBLE LUMBAR PANEL

[75] Inventor: Ralph G. Marrujo, Winston-Salem, N.C.

[73] Assignee: The Jepson Burns Corporation, Winston-Salem, N.C.

[21] Appl. No.: 80,677

[22] Filed: Jul. 31, 1987

[51] Int. Cl.$^4$ .............................................. B64D 11/06
[52] U.S. Cl. ................................. 244/122 R; 297/284; 297/460
[58] Field of Search .................. 244/122 R; 297/284, 297/460; 114/363

[56] References Cited

U.S. PATENT DOCUMENTS

| | | | |
|---|---|---|---|
| 2,843,195 | 7/1958 | Barvaeus | 297/284 |
| 2,981,314 | 4/1961 | Eklöf et al. | 297/284 |
| 3,762,769 | 10/1973 | Poschl | 297/284 |
| 3,938,858 | 2/1976 | Drabert et al. | 297/284 |
| 4,153,293 | 5/1979 | Sheldon | 297/284 |
| 4,156,544 | 5/1979 | Swenson et al. | 297/284 |
| 4,601,514 | 7/1986 | Meiller | 297/284 |
| 4,679,848 | 7/1987 | Spierings | 297/284 |
| 4,685,733 | 8/1987 | Machate et al. | 297/284 |

Primary Examiner—Joseph F. Peters, Jr.
Assistant Examiner—Lynn M. Fiorito
Attorney, Agent, or Firm—Mark I. Feldman

[57] ABSTRACT

An improved aircraft seat is equipped with a special flexible lumbar panel to better and more comfortably support the back of the passenger seated in the aircraft seat. The flexible lumbar panel can be used with different type of reclining chairs but is especially useful with high hinge point aircraft seats. The lumbar panel has a moveable lower end which can be guided by guide members. The upper end of the lumbar panel can be secured to a torque bar.

10 Claims, 2 Drawing Sheets

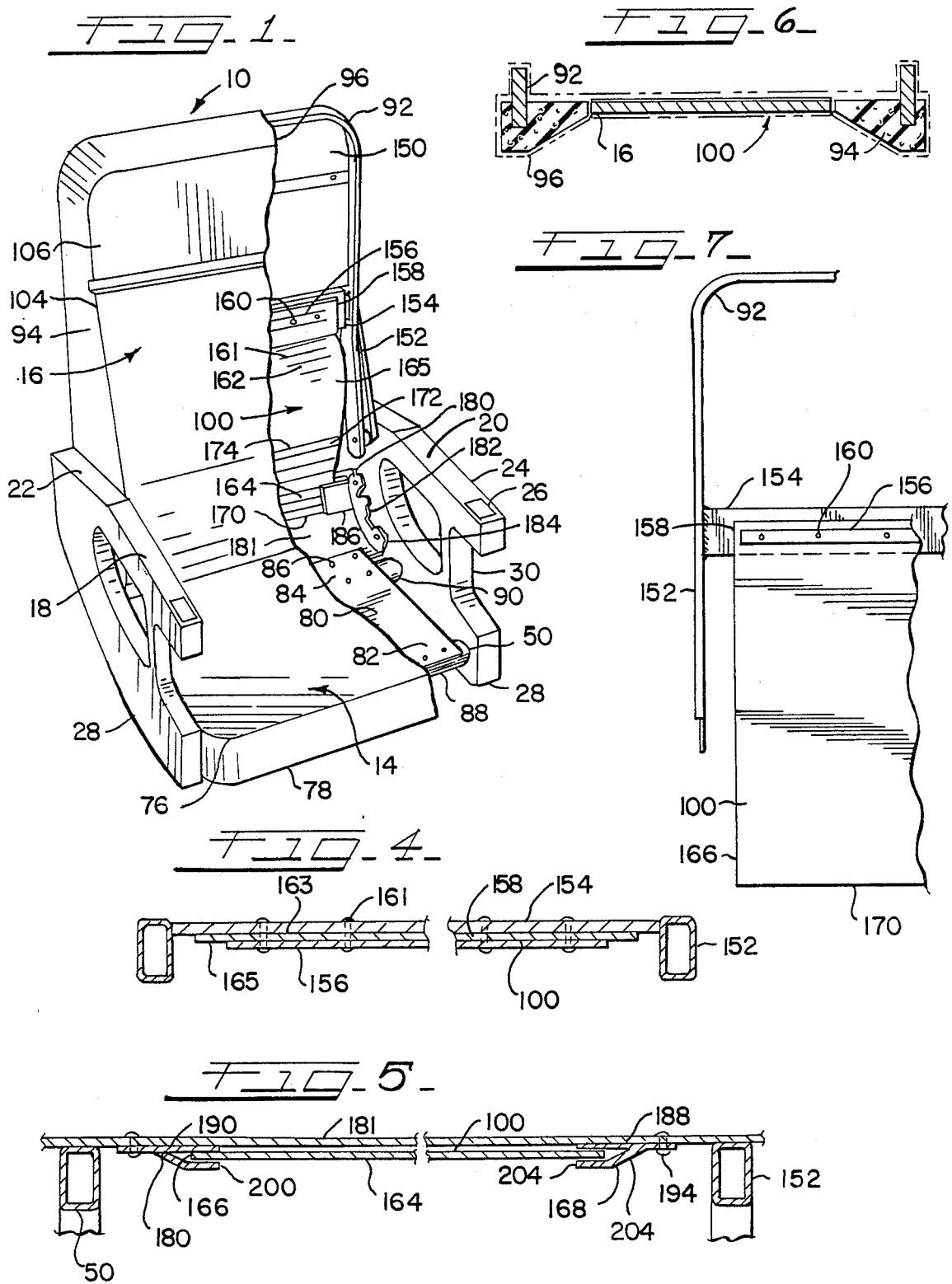

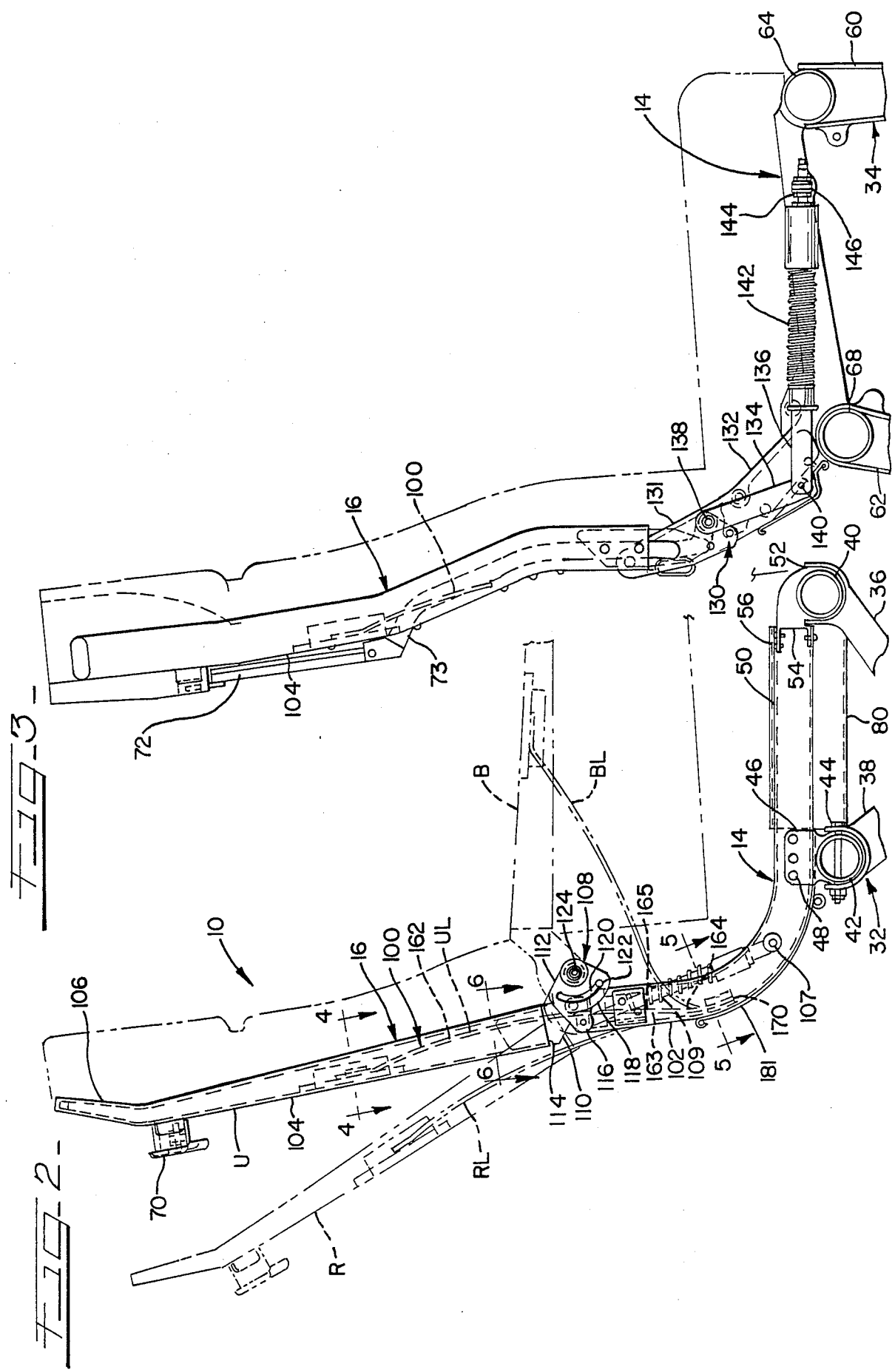

AIRCRAFT SEAT WITH FLEXIBLE LUMBAR PANEL

BACKGROUND OF THE INVENTION

This invention pertains to chairs and, more particularly, to aircraft seats.

Most aircraft have from one to five seats per row which are supported by appropriate leg structure. Because of the limited amount of seating space available on airplanes, aircraft seats do not usually have raisable footrests and can only recline a limited amount.

Aircraft seats must also be sturdy, comfortable, and secure, during normal aircraft operating conditions as well as under severe conditions that might impart large loads and torque on the seats and its occupants, such as during turbulence, abrupt maneuvering, rapid deceleration, air pockets, and storms or under crash or accident conditions.

Because of the above factors and applicable aircraft safety regulations, aircraft seats are functionally and structurally different in significant aspects from household reclining chairs.

Conventional aircraft seat backs usually have stationary fixed rigid metallic members spanning a tubular frame. The fixed members support the cushioning and upholstery used on seat backs which supports the seated occupant. In order to provide additional comfort to the occupant, many seat backs have been designed with hinge points near the theoretical body joint of the hip. This, however, creates problems at high density seat pitch causing the seat backs to unacceptably recline into the space occupied by the passenger seated behind the reclining seat.

In an effort to overcome the above problems, some aircraft seats have been constructed with high hinge points positioned 4 to 6 inches above the theoretical body joint of the hip. When such prior art high hinge points aircraft seats recline, however, they often tend to create extreme pressure, pain, and discomfort on the seated occupant's lumbar region of the occupant's back. Some refer to such conventional high hinge point aircraft seats as back breakers. Conventional high hinge point aircraft seats can be extremely uncomfortable, particularly on long flights overseas and coast-to-coast.

Over the years a variety of aircraft seats, chairs, and associated equipment have been suggested. Typifying some of these prior art aircraft seats, chairs, and associated equipment are those found in U.S. Pat. Nos. 2,098,426; 2,685,327; 3,588,172; 3,717,376; 3,938,858; 3,929,374; 4,047,758; 4,148,522; 4,157,203; 4,229,040; 4,291,916; 4,350,388; 4,354,709; 4,440,411; 4,452,485; Des. 257,707; and Des. 272,402. These prior art aircraft seats, chairs, and associated equipment have met with varying degrees of success.

It is, therefore, desirable to provide an improved aircraft seat which overcomes most, if not all, of the preceding problems.

SUMMARY OF THE INVENTION

An improved chair provides a comfortable, sturdy and safe aircraft seat. Advantageously, the novel aircraft seat is reliable, compact, and economical. It is also easy to use and effective.

Desirably, the novel aircraft seat enhances the well-being and relaxation of the passenger by increasing the support and comfort of the passenger's back. The aircraft seat is beneficial for both long and short flights.

To this end, the chair has a special back, seat, and leg structure. In order to enhance the comfort and back support of the person sitting in the seat, the back has a unique flexible panel with a moveable lower portion. The upper portion of the back is connected to the back frame assembly. The flexible panel can comprise a spring-like sheet composite back-supporting web.

Advantageously, the flexible lumbar panel is shaped and arranged to conform to the lumbar region of the back of typical airline passengers without the need for a shape forming triangular bar, rearward strip or distance member positioned in the back of the panel. The lumbar panel can smoothly flex, bend, and accommodate arcuate curved movements, when the back is moved from a generally upright position to a reclining position and vice versa. The flexible lumbar panel can have score lines or flexible hinged slats in its lower portion to accommodate different radii of curvature, so as to further complement and resiliently support the passenger's lumbar region. The preferred chair also has guide members to slidably receive and guide the movement of the lower portion of the lumbar panel.

In the preferred form, the independent flexible lumbar system and chair is equipped with a high hinge point seat back. The flexible lumbar panel is contoured (curved) into the seated occupant's lower back. The upper end of the contoured lumbar panel is fixedly attached or pivotally hinged at the midpoint or intermediate middle portion of the seat back. The lower end of the lumbar panel is positioned at the kick panel of the seat frame. The novel construction allows the contoured lumbar panel to act independently of the seat back's hinge point to better support the seated occupant at different angles of recline.

Advantageously, the ergonomic shape and flexibility of the special moveable lumbar panel provides more uniform comfort for a wide range of passenger shapes and sizes. The flexible lumbar panel also helps minimize the use of foam or other padding in the lumbar region, improves the seat density capability, and provides flexible long term comfort independent of the durability of the foam padding.

While the chair of this invention is particularly useful in airplanes, it can also be used in other vehicles and craft, such as in trains, commuter boats, buses, vans, etc. Furthermore, household and office reclining chairs can be equipped with the flexible moveable lumbar panel of the invention for added comfort and support.

A more detailed explanation of the invention is provided in the following description and appended claims taken in conjunction with the accompanying drawings.

BRIEF DESCRIPTION OF THE DRAWINGS

FIG. 1 is a perspective view of a high hinge point aircraft seat in accordance with principles of the present invention and illustrating portions removed for clarity and ease of understanding;

FIG. 2 is a side view of portions of a high hinge point aircraft seat in upright, reclining, and break over positions;

FIG. 3 is a side view of portions of a medium hinge point aircraft seat utilizing a lumbar panel of this invention;

FIG. 4 is a cross-sectional top view of the upper portion of the lumbar panel and associated components taken substantially along line 4—4 of FIG. 2;

FIG. 5 is a cross-sectional view of the lower portion of the lumbar panel guided by another type of guide members taken substantially along line 5—5 of FIG. 2;

FIG. 6 is a cross-sectional view of the aircraft seat taken substantially along line 6—6 of FIG. 2; and FIG. 7 is a fragmentary front view of portions of the lumbar panel attached to a torque bar.

DETAILED DESCRIPTION OF THE PREFERRED EMBODIMENTS

A reclinable (reclining) flexible lumbar, passenger aircraft seat and chair 10 (FIG. 1) enhances the comfort and support of the passenger sitting in the seat. The aircraft seat 10 is strong, stable, comfortable, and safe. The aircraft seat 10 can be used on single, double, triple, quad and quint configurations with each row of the aircraft having from one to five similar flexible lumbar aircraft seats, as desired. The aircraft seat 10 can be supported, elevated, and secured by an appropriate leg structure and assembly, such as shown in FIGS. 2 or 3. The leg structure is secured to the deck or floor of the airplane by aircraft fittings (not shown).

The aircraft seat 10 of FIG. 1 has a seat unit and assembly 14 which provides a seat to support the buttocks and upper legs of a person, a reclinable lumbar back unit and assembly 16 which provides a back to comfortably support the back of the person sitting on the seat, and a pair of pivotable arms 18 and 20 which provide arm rests to support the elbows and forearm portions of the person sitting on the seat.

Each of the arms 18 and 20 (FIG. 1) can have a sloping rearward portion 22 and a horizontal forearm portion 24 with an ashtray 26. The arms 18 and 20 can also have a uniform contour. The arms 18 and 20 can be pivotally cantilevered along the sides of the back. The arms 18 and 20 can also each have a curved support base 28 and an upright arm-supporting post member 30 which connects the curved support base 28 and the forearm portion 24. The arms 18 and 20 can pivot from a horizontal arm-supporting position to and upright storage position. One or both arms can be fixed in a stationary horizontal position, if desired.

The high hinge (pivot) point aircraft seat 10 of FIG. 2 has a leg structure and assembly 32 which supports and elevates the seat 14 to a substantially horizontal position. The leg structure and assembly 32 can have generally x-shaped legs and can include front forward legs 36 which slope downwardly and rearwardly and rear legs 38 which slope downwardly and forwardly. The leg structure and assembly 32 has front and rear cylindrical, tubular crossbars 40 and 42. The rear tubular crossbar 42 is fastened by a bolt 44 or rivets to a rear bracket 46 near the top of the rear leg 38. The rear bracket 46 is fastened by bolts 48 to the seat frame assembly 50 of the seat 14. The front tubular crossbar 40 is supported by a front bracket 52 near the top of the front leg 36. The front bracket 52 has a C-shaped head 54 which is secured by bolts 56 or other fasteners to the front of the seat frame assembly 50. A fabric bottom diaphragm 80 can be secured to the bottom of the seat frame assembly 50.

The leg structure and assembly 34 of the medium hinge (pivot) point aircraft seat of FIG. 3 has flanged front and rear legs 60 and 62 which support and elevate the seat 14 to a generally horizontal position. It also has front and rear tubular crossbars 64 and 68 securely along the tops of the front and rear legs 60 and 62, respectively.

The rearward portion of the back 16 of the aircraft seat can have a slidable pivoting tray latch assembly 70 as shown in FIG. 2 or an enlarged pivotable tray assembly 72 as shown in FIG. 3 which can be supported by swingable metal tray-arms 73.

As shown in FIG. 1, the seat 14 has padding providing a seat cushion 76. The seat cushion 76 is covered with a flexible seat cover 78. A flexible seat diaphragm 80 is connected to the base 28 and arms 18 and 20. The seat diaphragm 80 is a continuous assembly which spans the width of the seat. The seat diaphragm 80 provides a seat panel that is positioned below and supports the seat cushion 16 and the weight of the person sitting in the seat. Alternatively, the front and rearward portions 82 and 84 of the seat panel 80 can be fixedly secured by rivets 86, screws, or other fasteners to the cylindrical or tubular front and rear lateral crossbars 88 and 90 of the seat fame assembly 50. The rearward portion 84 of the seat panel 80 can also be riveted, fastened, or otherwise secured to the bottom portion of the curved lateral back surface 181 of the guide members 180. The front and rear crossbars 88 and 90 can be connected to the base 28 of the arms 18 and 20.

The back 16 (FIGS. 1 and 6) has a back frame assembly 92 and padding providing a back cushion and pad 94. The back cushion and pad 94 is covered with a fabric back cover 96. The back cushion and pad 94 is positioned forwardly of and supported by a flexible moveable lumbar panel 100. The back cushion and pad 94 can be bonded or attached to the flexible lumbar panel 100, such as by Velcro-type strips. The padding of the back 16 and seat 14 can be made of foam rubber. Rubberized horsehair or other types of padding can also be used, if desired. The back 16 and seat 14 can have strips of woven jute or other webbing to form a base for the upholstery. Springs can be connected to the webbing or other members to give the back and seat added shape and firmness.

The back 16 (FIG. 2) has a curved lower back portion 102 and an elongated upper back portion 104 with a headrest 106 near its top. The lower back portion 102 can be integrally connected, welded or otherwise fixedly secured to the seat 14 or can be pivotally attached to the seat 14 by pivot pins 107. The lower end of upper back portion 104 is pivotally connected to the upper end of the lower back portion 102 by pivot pin and bracket assemblies 108 positioned along the left and right sides of the back 16.

In the high hinge (pivot) point reclining aircraft seat 10 of FIG. 2, the pivot pin and bracket assemblies 108 define pivot points positioned from about four inches to about six inches above the theoretical body joint of the hip of the average person sitting in the seat. The pivot pin and bracket assemblies 108 and recline mechanism 109 permit the reclinable back 16 to be pivoted from an upright erect forward position U to a rearward reclining position R and vice versa, as well as to a horizontal forward break over position B.

The pivot pin assemblies 108 of FIG. 2 include upper and lower pivotable hinge members 110 and 112 with an upper portion 114, a nose portion 116, an arcuate ear-like portion 118 with a C-shaped arcuate slot 120, a guide pin 122, and a pivot pin 124. The pivot pin 124 provides a moveable pivot point.

In the medium hinge (pivot) point reclining aircraft seat of FIG. 3, the pivot pin and bracket assemblies 130 define pivot points positioned about the theoretical body joint of the hip of the average person sitting in the seat. The pivot pin and bracket assemblies 130 permit the reclinable back 16 to be pivoted from a generally upright erect position to a rearward reclining position and vice versa, as well as to a horizontal forward break over position. The pivot assemblies 130 include upper and lower hinge members 131 and 132 with an upper spring link 134 connected to a recline mechanism 136, and pivot pins 138 and 140. The recline mechanism 136 has a spring 142 and extends between and is hooked to the upper spring link 134 and a trunion member or fitting 144. A nut adjustment assembly 146 is connected to the recline mechanism 136 to adjust the upright position of the seat back 16. The recline mechanism 136 controls the extent, rate, and dampening of recline and return of the upper back portion 104 of the medium hinge point aircraft seat. The recline mechanism 109 of the high hinge point aricraft seat of FIG. 2 is structurally and functionally similar to the medium hinge point aircraft seat of FIG. 3.

As shown in FIG. 1, the back frame assembly 92 is connected to an upper headrest-supporting diaphragm portion 150 which supports the headrest 106. Complementary, arm-supporting, upright bifurcated side bars 152 extend below the headrest-supporting portion 150 along the sides of the back 16. The side bars 152 are pivotally connected to and extend above the arms (arm rests) 18 and 20. The side bars 152 can comprise inner and outer bars and can be solid or tubular.

A torque bar 154 (FIGS. 1, 4, and 7) also referred to as a mounting plate or rear crossbar, extends horizontally between and is welded or fastened to the side bars 152 (FIG. 7), at a location slightly below the headrest-supporting portion 150 at the intermediate or middle section of the upper back portion 104. The torque bar 154 is positioned at a height above the horizontal arm rests 18 and 20 and provides torsional rigidity to the back 16. A front intermediate crossbar 156 can extend horizontally across a substantial portion of the upper end 158 of the lumbar panel 100. The front intermediate crossbar 156 is positioned upon and mounted against the upper front surface of the lumbar panel 100. Rivets 160 (FIG. 1), bolts (FIG. 4), or other fasteners can securely mount and fixedly connect the upper end 158 of the lumbar panel 100 to the front intermediate crossbar 156 and the torque bar 154. Alternatively, the upper end 158 of the lumbar panel 100 can be bonded, welded or otherwise secured to the torque bar 154.

The lumbar panel 100 (FIGS. 1, 2, and 4) has a lumbar-shaped contour and configuration with a back surface 163 and a front surface 165 to support the lumbar region of the back of the person sitting in the chair (aircraft seat) without the use of a shape forming triangular bar, rearward strip or distance member positioned against the back 163 of the lumbar panel 100. The lumbar panel 100 is made of flexible spring-like composite sheet and is generally rectangular and imperforate except for the fastener holes at its upper end to accommodate the rivets 160, bolts, or other fasteners. The lumbar panel can also comprise a leaf spring or other resilient spring. Other flexible materials, such a resilient metals, flexible plastic, and elastomers can be used, as desired.

The lumbar panel 100 (FIG. 1) has a curved upper portion 162 and a slidable, slightly curved moveable lower portion 164. The upper portion 162 of the lumbar panel 100 has a greater radius of curvature than the moveable lower portion 164. As viewed from the front, the upper portion 162 has a convex curvature and the lower portion 164 has a concave curvature. The upper portion 162 has a fixed upper end and stationary top 158 which is fixedly secured by rivets 160, bolts, or other fasteners or alternatively bonded or welded to the torque bar 154 and the optional front intermediate crossbar 156. The lower portion 164 of the lumbar panel 100 has left and right upright side edges 166 and 168 (FIG. 5) and a free unattached bottom end 170 (FIGS. 1 and 7) positioned adjacent and in proximity to the rear crossbar 90 of the seat frame assembly 50. The lower portion 164 of the lumbar panel 100 can also have a set of lateral slats, ribs, or horizontal flaps 172 which are integrally and hingeably connected (hinged) to each other along horizontal score lines and depressions 174 to further accommodate curved movement of the lower portion 164.

The lumbar panel 100 (FIG. 2) is moveable from an arched reclining position RL when the back 16 is in the reclining position to a lesser arched upright position UL when the back 16 is in the upright position. The lumbar panel 100 is also moveable to a forward break over position BL. The radius of curvature of the lumbar panel 100 in the reclining position can range from about 1.5 to about 2 times greater than the radius of curvature of the lumbar panel 100 in the upright position. The radius of curvature of the lumbar panel 100 in the break over position can range from about 0.3 to about 0.75 times smaller than the radius of curvature of the lumbar panel in the upright position. The bottom edge 170 of the lumbar panel 100 is higher in the reclining position than in the upright position and lower in the break over position than in the upright position. Advantageously the configuration of the flexible lumbar panel 100 changes to accommodate, compliment, and support the lumbar region of the passenger's back for greater passenger comfort when the aircraft seat is in a reclining position and in an upright position, as well as positions there between when the aircraft seat is being moved from the reclining position to the upright position and vice versa.

As shown in FIGS. 1 and 5, guides (guide members) 180 can be riveted, fastened, or otherwise secured to the left and right sides of the kick panel assembly 181 or to the base 28 of the arms 18 and 20 to slidably receive and guide the side edges 166 and 168 (FIGS. 1 and 2) of the slidable lower portion 164 of the lumbar panel 100. The guides 180 provide a guide assembly and can be formed or cast of metal or molded or fabricated of impact-resistant plastic, such as polypropylenes, polyethylene, mylar, or polytetrafluoroethylene (Teflon). Other materials can be used.

In the embodiment of FIG. 1, the guide members 180 comprise concave impact-resistant guide members which engage the back of the lumbar panel 100. The guide members 180 can be fastened to the kick panel 181 and can be riveted, fastened, or otherwise secured to the back 16 or to the base 28 of the arms 18 and 20, such as via a bracket or member 182 with trapezoidal attachment portions or protuberances 184. The concave front surface of the kick panel 181 provides an arcuate auxiliary guide portion which is attached to the frame assembly 50. Symmetrical tabs 186 can be attached to and cantilevered inwardly from the upper end of the ear-like side portions 182. The symmetrical tabs 186 provide upper, concave arcuate, front guide portions which are positioned in front of the lower portion 164 of the lumbar panel 100 to guide, slidably receive, and engage the moveable lower portion 164 of the lumbar panel 100.

In the embodiment of FIG. 5, the guides 180 have back guide members 188 with flat or planar upright back portions 190 which are secured by screws 194 or other fasteners to the kick panel 181. Zigzag s-shaped front guide members 200 are attached to and cantilevered inwardly from the back guide members 188. The front guide members 200 are positioned in front of the lower portion 164 of the lumbar panel 100 to guide, slidably receive, and engage the moveable lower portion 164 of the lumbar panel 100. The front guide members 200 have attached outer end portions connected to the back guide members 188, inclined intermediate portions 204, and inner unattached end portions 204.

EXAMPLE

An aircraft seat was constructed with a flexible lumbar panel substantially as shown in FIGS. 1 and 2. The lumbar panel was 15 inches long when flattened. The lumbar panel had a 5.26 inch radius of curvature in the reclining position, a 2.92 inch radius of curvature in the upright position, and a 2 inch radius of curvature in the break over position. The aircraft seat with the flexible lumbar panel met with unexpected surprising good results in conforming to and comfortably supporting the lumbar region of the back of each person sitting in the aircraft seat in the reclining and upright positions and therebetween.

The lumbar panel 100 of the medium hinge (pivot) point reclining aircraft seat of FIG. 3 is structurally and functionally similar to the lumbar panel 100 of the high hinge (pivot) point aircraft seat of FIG. 2 and has similar advantages.

In normal use, the aircraft seats of FIGS. 1-3 can be readily pivoted from a generally upright erect position to a reclining position and vice versa. As this occurs the contour, configuration, and curvature of the lower and upper portions 162 and 164 of the lumbar panel 100 varies to complement, firmly engage, and comfortably support the passenger sitting in the seat. This is accomplished by the simultaneous flexing and bending of the lumbar panel 100 and the reciprocating sliding movement of the lower portion 164 of the lumbar panel 100 along the guides 180.

Among the many advantages of the novel lumbar aircraft seats are:
1. Enhanced passenger comfort for both long and short flights.
2. Better support of the lower lumbar region of the passenger's back
3. Decreased passenger back pain.
4. Improved passenger well-being, health, and relaxation.
5. Superior load-carrying capacity.
6. Excellent structural strength and integrity.
7. Outstanding resistance to failure during crash conditions and normal travel.
8. Greater safety for passengers and flight personnel.
9. Simple to use.
10. Convenient.
11. Economical.
12. Reliable.
13. Efficient.
14. Effective.

Although embodiments of the invention has been shown and described, it is to be understood that various modifications and substitutions, as well as rearrangements of parts, can be made by those skilled in the art without departing from the novel spirit and scope of this invention.

What is claimed is:

1. A chair, comprising:
seat means for supporting the seat and upper legs of a person;
leg means connected to said seat means for supporting said seat means; and
back means connected to said seat means for supporting the back of the person sitting on said seat means;
said back means comprising a back frame assembly and a flexible moveable lumbar panel, said back frame assembly having an upper back portion with an intermediate section, a headrest-supporting portion, and a substantially horizontal torque bar positioned slightly below said headrest-supporting portion at said intermediate section of said upper back portion for enhancing torsional rigidity of said back frame assembly, said moveable lumbar panel having a lumbar shaped contour for supporting the lumbar region of the back of the person sitting in the chair, said moveable lumbar panel having a curved upper portion with a fixed upper end fixedly connected to and cantilevered from said torque bar and a moveable lower portion with a free unattached bottom end positioned in proximity to said seat means, said upper portion of said lumbar panel having a convex curvature and said lower portion of said lumbar panel having a concave curvature as viewed from the front of said chair, and said lumbar panel having a back surface and a front surface for flexibly supporting the lumbar region of the back of the person sitting on said seat means in the absence of a triangular bar, rearward strip, or distance member positioned against the back surface of said lumbar panel.

2. A chair, comprising:
seat means for supporting the seat and upper legs of a person;
leg means connected to said seat means for supporting said seat means;
reclining back means operatively connected to said seat means for supporting the back of the person in a reclining position and in a generally upright position; and
said back means having a back frame assembly and a moveable lumbar panel comprising a generally rectangular composite sheet, said back frame assembly having a torque bar for enhancing torsional rigidity of said back means, said moveable lumbar panel having a lumbar shaped contour for supporting the lumbar region of the person sitting in the chair, said moveable lumbar panel having an upper curved portion with a fixed upper end fixedly attached to said torque bar of said back frame assembly and a moveable lower portion with a lower free unattached end positioned in proximity to said seat for slidable movement relative to said frame assembly when the person is moving from a reclining position to a generally upright position and vice versa, said upper portion of said lumbar panel having a convex curvature and said lower portion of said lumbar panel having a concave curvature as viewed from the front of said chair, and attachment means for fixedly attaching said upper end of said lumbar panel to said torque bar of said back frame assembly.

3. A chair, comprising:

a seat unit providing a seat supporting the buttocks and upper legs of a person, said seat having a cushion, a fabric seat cover positioned upon and covering said seat cushion, a seat frame assembly, and a flexible composite seat panel positioned below said cushion, said seat panel having a rearward seat panel portion fixedly secured to said seat frame assembly;

a leg assembly fixedly secured to said seat for supporting said seat and elevating said seat to a substantially horizontal position, said leg assembly including front legs and rear legs;

a reclinable back unit providing a back connected to said seat for supporting the back of the person sitting on said seat, said reclinable back unit having a left side, a right side, a lower back portion, and an upper back portion with a headrest;

pivot assemblies operatively connecting said upper and lower back portions along the sides of said back for permitting said reclinable back unit to be pivoted from a substantially upright erect position to a rearward reclining position, said pivot assemblies defining a high pivot point positioned substantially above the body joint of the hip of the person sitting in said seat, and said pivot assemblies comprising pivotable hinge members selected from the group consisting of brackets, pivot pins, and linkages;

a pair of arms providing arm rests positioned along the sides of said reclinable back unit;

said reclinable back unit comprising padding, a back frame assembly, and a flexible moveable lumbar panel positioned rearwardly of said padding;

said back frame assembly having complementary arm-supporting side bars extending above and connected to said arms along said sides of said reclinable back unit, said frame assembly having a torque bar for enhancing the torsional rigidity of said reclinable back unit, said torque bar extending between and connecting said side bars in proximity to an intermediate portion of said reclinable back unit, and said torque bar being positioned below said headrest and substantially above the height of said arms;

said moveable lumbar panel comprising flexible sheet material and having a lumbar shaped contour for supporting the lumbar region of the back of the person sitting in said chair, said panel having a curved upper portion with a fixed upper end fixedly secured to and cantilevered from said torque bar and said panel having a slidable lower portion with side edges and a free unattached bottom end positioned in proximity to said seat, said upper portion of said lumbar panel having a convex curvature and said lower portion of said lumbar panel having a concave curvature as viewed from the front of said chair, and said lumbar panel being moveable from an arched reclining position when said reclinable back unit is in said reclining position to a lesser arched upright position when said reclinable back unit is in said upright position when said reclinable back unit is in said upright erect position; and guides positioned along the sides of said reclinable back unit for slidably receiving and guiding said side edges of said lower portion of said lumbar panel, said guides being positioned below said side bars and said arms in proximity to said rearward seat panel portion of said seat panel.

4. A chair in accordance with claim 3 wherein said comprise concave impact resistant guide members.

5. A chair in accordance with claim 3 wherein said guides comprise back guide members and generally zigzag front guide members for slidably receiving and engaging said lower portion of said lumbar panel.

6. A chair in accordance with claim 4 wherein said back includes an intermediate crossbar positioned in front of and mounted against said upper end of said lumbar panel and fasteners for fixedly connecting said upper end of said lumbar panel to said intermediate crossbar and said torque bar.

7. A chair in accordance with claim 4 wherein said lower portion of said lumbar panel has a radius of curvature, said radius of curvature being substantially greater when said lumbar panel is in said reclining position.

8. A chair in accordance with claim 7 wherein said radius of curvature of said lumbar panel in said reclining position is from about 1.5 to about 2 times greater than said radius of curvature in said upright position.

9. A chair in accordance with claim 7 wherein said lumbar panel is moveable to a break over position located forwardly of said upright position and said radius of curvature of said lumbar panel in said break over position ranges from about 0.6 to about 0.75 smaller than said radius of curvature in said upright position.

10. A chair in accordance with claim 7 wherein said lower portion of said lumbar panel has a set of lateral slats extending across said lower portion, said lateral slats being hingeably connected to each other for accommodating curved movement of said lower portion of said lumbar panel.

* * * * *